April 23, 1963 W. E. BOOKER 3,086,829
JOURNAL BOX LUBRICATOR PAD
Filed March 18, 1960 2 Sheets-Sheet 1

INVENTOR.
William E. Booker
BY
Thos E Scofield
ATTORNEY.

April 23, 1963 W. E. BOOKER 3,086,829
JOURNAL BOX LUBRICATOR PAD
Filed March 18, 1960 2 Sheets-Sheet 2

INVENTOR.
William E. Booker
BY
ATTORNEY.

United States Patent Office 3,086,829
Patented Apr. 23, 1963

3,086,829
JOURNAL BOX LUBRICATOR PAD
William E. Booker, Blue Springs, Mo., assignor to Gustin-Bacon Manufacturing Company, a corporation of Delaware
Filed Mar. 18, 1960, Ser. No. 15,962
2 Claims. (Cl. 308—243)

This invention relates to a journal box lubricator pad for retaining and wicking car journal lubricating oil in standard railroad journal boxes and refers more particularly to such a pad including a core portion made up of an integral mat body composed of fibers bonded with an oil resistant thermosetting resin containing a cellular oil carrying insert.

Standard railroad journal packing boxes completely surround a cylindrical journal having a flanged outer portion thereon. This flanged portion constricts the space between the journal and the packing box so that the entrance to the packing chamber is smaller than the space to be occupied by the packing material, thus making it necessary to bend and compress packing materials being inserted in the box. Additionally, in operation, the Babbitt-faced bronze bearing which overlies the journal may jump a considerable distance from its seat on the journal, as, for instance, as much as a quarter of an inch.

The prevalent form of journal box packing is cotton and wool waste material which has been immersed in and saturated with oil for a considerable period prior to use. The purpose of such journal packing is to wick up oil from the bottom of the journal box and transfer it to the underside of the journal so as to continuously lubricate the surface of the journal as it passes under the bearing. Thus, additional quantities of oil are inserted in the box, occupying various levels in the lower portion thereof, and wicking up through the packing material to the underside of the journal.

Due to the considerable motion of the journal, if any of the packing material is loose and is carried up by the journal so as to intrude itself between the bearing and the journal, so-called "waste grab" occurs which generates considerable friction and heat and, if of sufficient magnitude and duration, causes the so-called "hot box." Since the materials of prior use, such as cotton, quickly carbonize, they contribute to friction and heat, thus promoting hot boxes and wear on the journal. These conventional materials create a constant maintenance problem, it being necessary to closely inspect each journal at the railroad division points, or every 250 miles.

It is common practice to remove these packing materials at intervals, launder and renovate them, and return them to service. In the case of the loose fill or bulk materials, they are easily pulled from the box by means of a metallic hook, the fill material being fairly well integrated by the interentanglement of its fibers, and, in particular, by the thread stock present in the waste.

A shaped or formed material or integral body which will maintain a constant pressure on the underside of the journal and therefore insure its lubrication, is preferred over the loose fill materials which have been used in the past. However, the shaped or formed materials or integral bodies previously provided have a number of failings. Thus, they do not hold a sufficient quantity of oil, they do not feed the oil in sufficiently effective fashion to the journal surface, they do not provide a substantially uniform pressure against the journal throughout the service life, the materials of which they have been formed do not resist the effects of oil and both high and low temperatures sufficiently effective, they do not provide a maximum service life with minimum wear, they are not easy to put in and take out of the journal box and they do not retain their shape continuously and constantly over long periods of hard wear.

Therefore, an object of the present invention is to provide a formed or shaped journal box lubricator pad which exerts a constant pressure on the underside of the journal throughout its service life, yet a limited and not objectionable pressure, thereby insuring proper lubrication, said pad insertable in the journal box for long periods of time without removal or reconditioning while retaining its form and functional characteristics.

A further object of this invention is to provide a journal box packing element which may be conveniently inserted or removed through the small entrance to the journal box or journal packing chamber without the use of special tools.

Another object of the invention is to provide a journal box lubricator pad having a relatively tough, dense, yet permeable outer layer which provides optimum wear, toughness for insertion and desirable oil transfer qualities, and in combination therewith, a relatively low density filler which carries a maximum amount of oil therein, and exerts the least practicable amount of pressure on the underside of the journal while yet providing the desired surface contact; these constructions and features permitting the journal to be run at a relatively low temperature.

Still other objects of the invention include the features of shape or size retention despite the use of natural textile fibers, increased oil retentivity over standard waste by weight, absence of long fibers despite the use of natural textile fibers and the ability to give off oil at the surface of the pad in contradistinction to regular conventional waste.

Other objects of the invention include provision of a lubricator pad which holds a maximum quantity of oil, feeds the oil in optimum fashion to the journal surface, constantly retains its shape and resists the effects of oil and both high and low temperature.

Other and further objects of the invention will appear in the course of the following description thereof.

In the drawings, which form a part of the instant invention and specification and are to be read in conjunction therewith, there are shown embodiments of the invention and, in the various views, like numerals are employed to indicate like parts.

Referring to FIGS. 1–4, inclusive, first, therein is shown one form of the inventive journal box lubricator pad. This form is a "twin pack," wherein two pockets are formed in the casing or jacket to receive two core bodies or cartridges, each having a resilient filler. A double pocket modification is preferred but not required. The combination of the jacket, core body and resilient filler, as to be described, is itself useful and a part of the instant invention.

Figure 1:
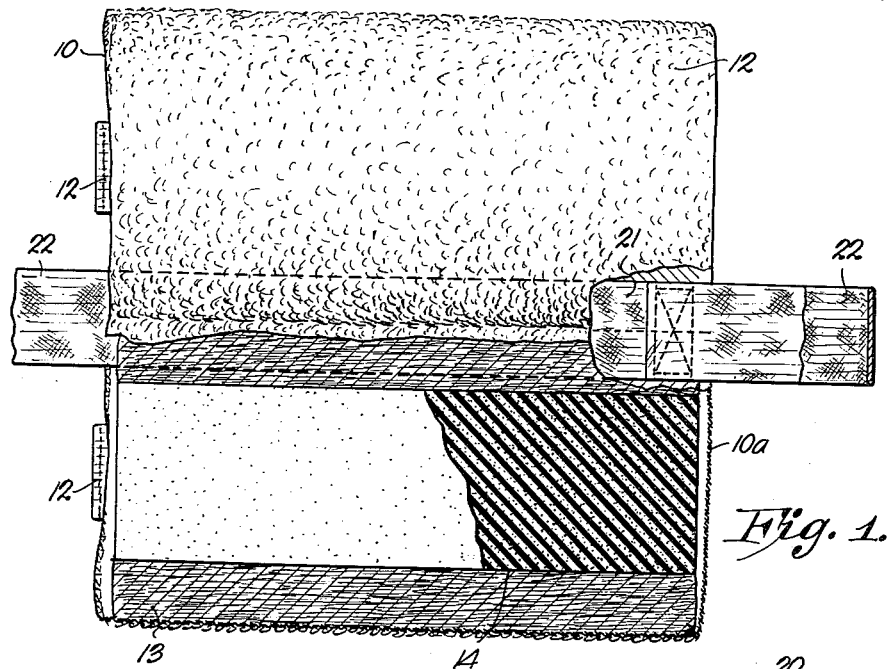
FIG. 1 is a top view with parts cut away illustrating one form of the inventive lubricator pad.
Figures 3, 4:
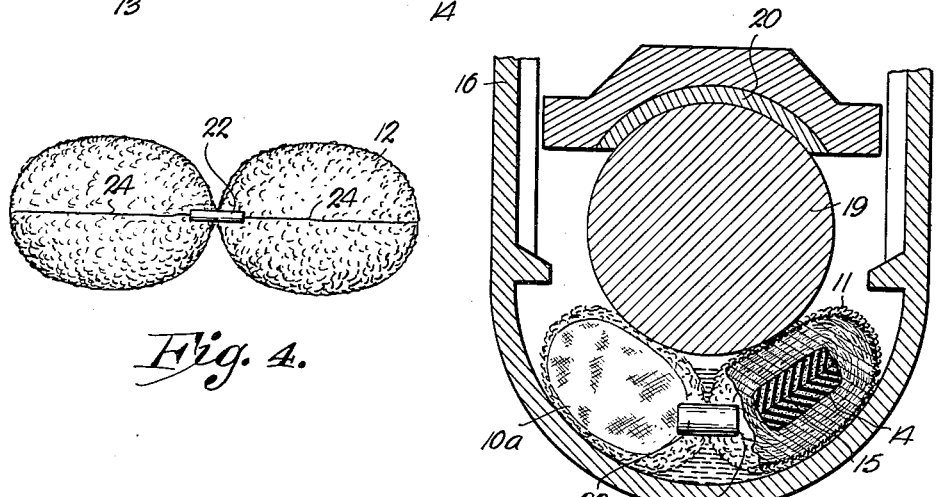
FIG. 3 is a cross-sectional view through a journal box with the inventive journal box lubricator pad of FIGS. 1 and 2 positioned therein, the latter shown in end view from the other end of FIG. 2, a portion of the pad cut away to show the internal construction.
FIG. 4 is an end view of a modification of the inventive journal box lubricator pad.
Figure 2:
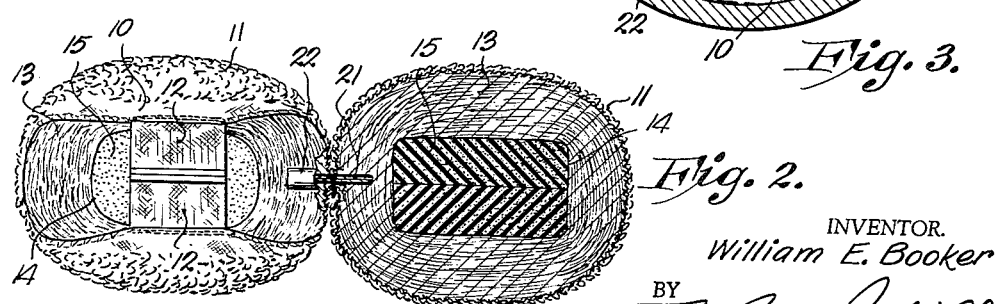
FIG. 2 is an end view of the pad modification of FIG. 1 with parts cut away to better show the internal construction of the pad.

The outer absorbent casing or jacket 10 is preferably formed of a strong, durable textile fabric, such as canvas, having an outer loop pile or napped surface 11. The jacket may be composed of one or more suitably connected pieces of fabric. A single piece construction is preferably employed. In forming the single piece jacket "twin pack" pad construction, a piece of material of suitable length and width is selected. This piece of material is folded from each end upon itself with its pile surface outermost to form upper and lower surfaces. The ends are stitched together to the lower surface, thereby forming two equal sized pockets in the casing which are open at each end. The open ends, after the casing or jacket is filled as to be described, may be closed by stitching the edges together at each end as in FIG. 4 to form seams, or stitching appropriate pieces 12 of heavy textile fabric to each side of each pocket and across each pocket's open end or stitching a panel of like material across the pocket's open face as at 10a (FIG. 3). The described pockets are designed to receive oil storage core bodies 13 or cartridges of resilient material as described below.

Core bodies or cartridges 13 are made of resin bonded fibers of various lengths molded into an integral body of a generally elliptical shape with either a rectangular, oval or round hole 14 so located as to permit insertion of a core 15 of cellular resilient material after curing. The fibrous portion of the core bodies or cartridges 13 is molded by wrapping semi-cured mat formed of appropriate fibrous materials and appropriate thermosetting resin binder around a mandrel and inserting the same in a mold of generaly elliptical shape for final cure. Density of the finally cured core bodies or cartridges is optimum at 6 pounds per cubic foot with an allowable range of density of 4½ to 7 pounds per cubic foot. Above the latter limiting density, there is obtained too great a pressure on the journal and too little oil retentivity of the pad. Below the former lower density, there is insufficient pressure applied to the journal to efficiently lubricate the same.

Sources of fibers for use in the inventive pad or core or cartridges include all commercially available organic fibers, that is, all natural textile fibers and all synthetic textile fibers, provided that any such fiber is one which has at some time commercially been woven into cloth or is capable of such. If a fiber is too short and brittle to be woven it is not acceptable. The class of one of a natural textile fiber, a commercially available synthetic textile fiber, and any mixture thereof would define those fibers acceptable for use as a fiber source combined with the acceptable binder to provide the final molded mat comprising the core body or cartridge. Examples of natural textile fibers which are suitable include wool, cotton, linen, jute, hemp and sisal, the latter three less preferred. Examples of synthetic textile fibers which are acceptable include viscose, cellulose, acetate, nylon (superpolymeric amide), "Dacron" (polyester), "Orlon" (acrylonitrile polymer). An optimum aggregation of fibers for use in formulating the inventive core bodies or cartridges would comprise the fibers in the core body made up of at least 50 percent by weight of one of natural textile, viscose, and natural textile and viscose fibers, with at least substantially the remainder comprising synthetic fibers. The fiber diameter is not critical as a range of from 3 to 100 microns, at least, is considered in the passage from saponified acetate to regular acetate (a top of 73 microns). All cloth sources of textile fibers must be so processed (such as by picking or hammermilling) to fiber or thread state, from whence they must be passed to some procedure which will provide uniform randomization of the fibers, such as in a conventional garnetting procedure. Any fibers from any source which are employed in the core bodies comprising the instant invention or a part thereof must be uniformly randomized as in a suitable garnetting procedure. Once the fibers are uniformly randomized by suitable garnetting procedures (toothed roll machines), the binder may be added. An optimum thread or fiber stock is three-quarter hammermill stock, which means stock beaten until it drops through a three-quarter inch screen. The garnetts pull most fibers apart in order to make a web which is blown onto a suitable furnace chain to receive the binder according to the teaching of the patents below.

Suitable garnetting procedures are disclosed in the patents to Stephens 2,825,389, issued March 4, 1958, "Process of Making a Mat or Felted Structure" and 2,619,151, to Sheidley, issued November 25, 1952, "Method and Apparatus for Manufacturing Fibrous Mats."

The plastic employed in the binder must be both thermosetting and oil resistant, such as powdered phenolformaldehyde, melamine, or urea resin. The percentage by weight of binder of the core body or cartridge before curing is critical and must be within the range of 15 percent to 30 percent. Departure from this range prevents operation of the pad in the inventive manner because, at a greater binder percentage by weight, the pad is too rigid, and, below the lower limit of the range, too flaccid.

Specific examples of typical textile-synthetic fiber mixtures operative to produce the instant invention are as follows:

| Substance | First Sample, percent | Second Sample, percent |
| --- | --- | --- |
| Moisture | 4.4 | 4.4 |
| Oil | 1.06 | 1.58 |
| Acetate Rayon | 4.0 | 6.28 |
| Viscose Rayon | 16.1 | 25.13 |
| Cotton | 73.07 | 62.12 |
| Wool | .95 | .49 |

A sponge rubber or sponge plastic core 15 is inserted in the hollow portion of each core body. Said insert is preferably co-extensive in length with the length of the hollow portion of the core bodies and snugly fits in the cross section thereof. Without the provision of the insert resilient cellular material, the pad itself would eventually collapse under the heavy action and duty in the journal box. The material of the core portion must be oil resistant and high temperature resistant as well as possess low temperature flexibility. Foamed synthetic rubber of 6 pounds per cubic foot density is satisfactory. Open or closed cell structures are both satisfactory.

Referring to FIG. 3, journal box 16 has a lower packing receiving portion 17 surmounted by inward extension 18. Extending into the box 16 is journal 19, the portion shown in FIG. 3 comprising a milled portion seating upwardly against bearing 20, and having a terminal flange portion which is not shown. The lubricator pad is designed to be positioned between the lower periphery of the journal 19 and the surrounding box 17 and extend axially not substantially less than the length of the bearing contacting the journal. The pad is designed to overoccupy the space between said journal and said box, thereby maintaining contact with the face of the journal under the severest operating conditions for an extended length of time.

Tab 21, having grommeted opening 22 therein is attached to the end of the pad for removal purposes from the journal. Alternatively, a looped end may be provided.

FIG. 4 shows a napped surface twin pack pad sealed by seams 24 across the ends of the pockets.

Referring to FIGS. 5–8, inclusive, therein is shown a second form of the inventive pad. Core bodies or cartridges 25 are identical in structure and substance to the core bodies of the modification of FIGS. 1–4, with the exception that they are inwardly cut at the ends thereof as indicated at 25a. Openings 25b are formed centrally thereof of the same character as openings 14 in the previous modification and central core portions 26 are provided of the same character as core portions 15 in the previous modification.

Figure 7:
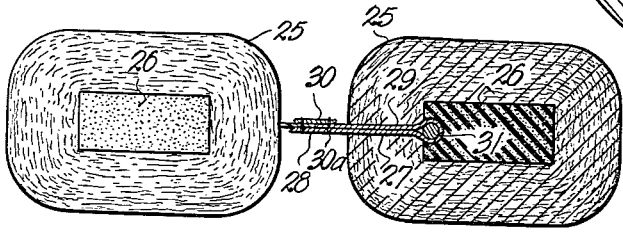
FIG. 7 is a view taken along the line 7—7 of FIG. 5 in the direction of the arrows.

Means are provided for securing together in proper spaced relationship the paired core bodies 25. Intermediate one side longitudinal edge of each core body are formed a pair of passages or openings 27. As best seen in FIG. 7, a strip of heavy, strong, textile material such as canvas is looped over upon itself at the ends thereof to form end loops 29 in the strip 28, the free ends of the strip 28 being secured by a common elongate band 30 stitched at 30a through the overlapping portions of the strip 28. The looped ends 29 of the strips 28 may be inserted through the openings 27 and an elongate means 31, such as a plastic or metal rod, inserted through the loops interiorly of the passages or openings 25b to removably secure the loops in the openings 27 and core bodies 25. The band 29 may extend between the two strips.

Figure 5:
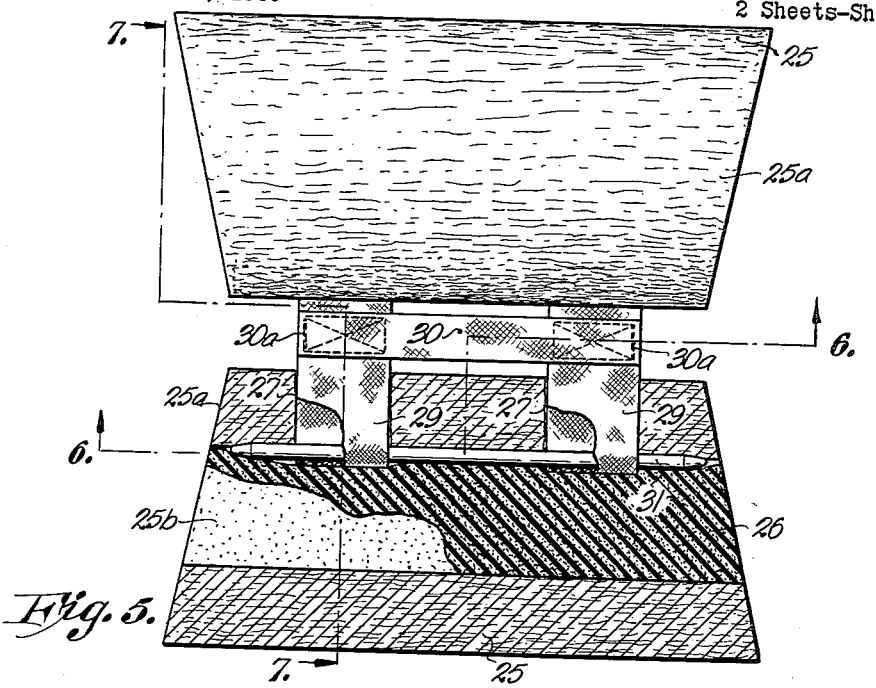
FIG. 5 is a top view with parts cut away illustrating a second form of the inventive lubricator pad.
Figure 6:
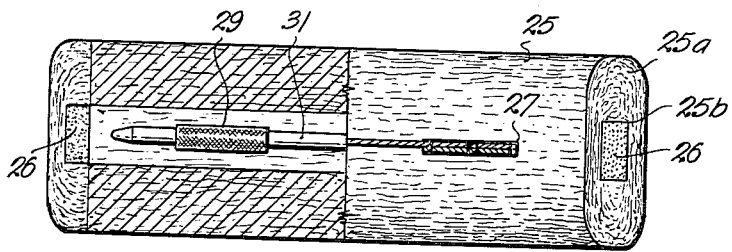
FIG. 6 is a view taken along the line 6—6 of FIG. 5 in the direction of the arrows.
Figure 8:
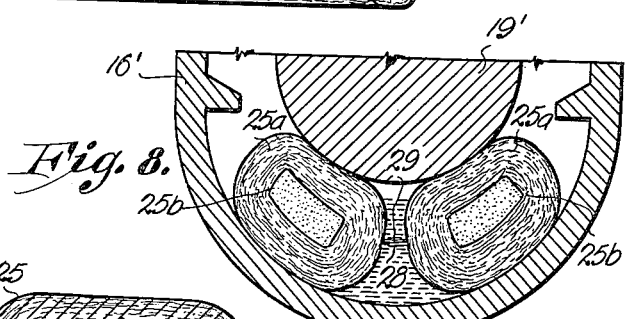
FIG. 8 is a cross-sectional view through a journal box with the inventive journal box lubricator pad of the previous three figures positioned therein, the latter shown in end view.

The construction of FIGS. 5–7 is shown emplaced in a journal box in FIG. 8. Parts identical to the journal box of FIG. 3 are numbered the same, but primed.

From the foregoing it will be seen that a journal box packing has been provided embodying all of the objects hereinabove set forth.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawings is to be interpreted as illustrative and not in a limiting sense.

Having thus described my invention, I claim:

1. A journal box lubricator pad comprising a pair of integral elongate fibrous bodies having lengths greater than their widths and thicknesses, the fibers in said bodies made of one of the group consisting of natural textile fibers, synthetic textile fibers and a mixture of natural textile and synthetic fibers, said fibers randomly oriented, the fibers bonded together with an oil resistant thermosetting resin, each said integral body having a hollow open portion therein extending longitudinally and axially thereof, a core portion within and at least substantially filling each hollow body portion, said core portions formed of resilient cellular material, and means connecting said integral bodies whereby to substantially align the longitudinal axis thereof and ends thereof, said means connecting said bodies including a strip of flexible material extending through openings in the sides of the bodies and retainer means in said hollow portions of the said bodies engageable with said strip, the bodies and core portions therewithin adapted to extend substantially parallel to the journal when positioned next thereto.

2. A journal box lubricator pad as in claim 1 wherein said strip extends through a plurality of openings in the side of each body.

References Cited in the file of this patent
UNITED STATES PATENTS

| | | |
|---|---|---|
| 2,798,776 | Harkenrider | July 9, 1957 |
| 2,869,944 | Barton et al. | Jan. 20, 1959 |
| 2,929,665 | Sockell | Mar. 22, 1960 |
| 2,991,134 | Harkenrider | July 4, 1961 |